United States Patent
Wang et al.

(10) Patent No.: US 11,674,091 B2
(45) Date of Patent: Jun. 13, 2023

(54) CATALYTIC CRACKING GASOLINE PREHYDROGENATION METHOD

(71) Applicant: FUZHOU UNIVERSITY, Fujian (CN)

(72) Inventors: Tinghai Wang, Fujian (CN); Xiaojun Bao, Fujian (CN); Yuanyuan Yue, Fujian (CN); Xueli Wang, Fujian (CN); Jie Liu, Fujian (CN); Haibo Zhu, Fujian (CN); Pei Yuan, Fujian (CN); Zhengshuai Bai, Fujian (CN)

(73) Assignee: FUZHOU UNIVERSITY, Fujian (CN)

( * ) Notice: Subject to any disclaimer, the term of this patent is extended or adjusted under 35 U.S.C. 154(b) by 207 days.

(21) Appl. No.: 17/133,641

(22) Filed: Dec. 24, 2020

(65) Prior Publication Data

US 2021/0122986 A1 Apr. 29, 2021

Related U.S. Application Data

(63) Continuation of application No. PCT/CN2018/122104, filed on Dec. 19, 2018.

(30) Foreign Application Priority Data

Sep. 11, 2018 (CN) .......................... 201811058042.5

(51) Int. Cl.
| | | |
|---|---|---|
| C10G 45/00 | (2006.01) | |
| C10G 45/12 | (2006.01) | |
| B01J 23/888 | (2006.01) | |
| B01J 29/48 | (2006.01) | |
| B01J 35/10 | (2006.01) | |
| B01J 37/00 | (2006.01) | |
| B01J 37/02 | (2006.01) | |
| B01J 37/08 | (2006.01) | |

(52) U.S. Cl.
CPC .......... *C10G 45/12* (2013.01); *B01J 23/8885* (2013.01); *B01J 29/48* (2013.01); *B01J 35/1095* (2013.01); *B01J 37/0036* (2013.01); *B01J 37/0213* (2013.01); *B01J 37/08* (2013.01); *C10G 2300/202* (2013.01); *C10G 2300/4006* (2013.01); *C10G 2300/4012* (2013.01); *C10G 2300/4018* (2013.01); *C10G 2300/4025* (2013.01); *C10G 2400/02* (2013.01)

(58) Field of Classification Search
CPC .. B01J 23/8885; B01J 23/883; B01J 37/0036; B01J 37/0209; B01J 37/0213; B01J 37/08; B01J 35/1095; B01J 29/48; C10G 45/12; C10G 2400/02; C10G 2300/202; C10G 2300/4025; C10G 2300/4018; C10G 2300/4006; C10G 2300/4012
See application file for complete search history.

(56) References Cited

FOREIGN PATENT DOCUMENTS

| | | |
|---|---|---|
| CN | 101088614 | 12/2007 |
| CN | 101173185 | 5/2008 |
| CN | 101191079 | 6/2008 |
| CN | 101484241 | 7/2009 |
| CN | 101885985 | 11/2010 |
| CN | 103372450 | 10/2013 |
| CN | 103480432 | 1/2014 |
| CN | 106179354 | 12/2016 |
| CN | 106732637 | 5/2017 |
| JP | S57184442 | 11/1982 |

*Primary Examiner* — Prem C Singh
*Assistant Examiner* — Brandi M Doyle
(74) *Attorney, Agent, or Firm* — JCIP Global Inc.

(57) ABSTRACT

A catalytic cracking gasoline prehydrogenation method is provided. Thiol etherification and double bond isomerization reactions are carried out on catalytic cracking gasoline through a prehydrogenation reactor. The reaction conditions are as follows: the reaction temperature is between 80° C. and 160° C., the reaction pressure is between 1 MPa and 5 MPa, the liquid-volume hourly space velocity is from 1 to 10 $h^{-1}$, and the hydrogen-oil volume ratio is (3-8):1; a prehydrogenation catalyst comprises a carrier and active ingredients, the carrier contains an aluminium oxide composite carrier with a macroporous structure and one or more of ZSM-5, ZSM-11, ZSM-12, ZSM-35, mordenite, amorphous form aluminum silicon, SAPO-11, MCM-22, a Y molecular sieve and a beta molecular sieve, the surface of the carrier is loaded with one or more of the active ingredients cobalt, molybdenum, nickel and tungsten; based on oxides, the content of the active ingredients is between 0.1% and 15.5%.

14 Claims, No Drawings

CATALYTIC CRACKING GASOLINE PREHYDROGENATION METHOD

CROSS-REFERENCE TO RELATED APPLICATION

The present application is a continuation of international application of PCT application serial No. PCT/CN2018/122104 filed on Dec. 19, 2018, which claims the priority benefit of China application No. 201811058042.5 filed on Sep. 11, 2018. The entirety of each of the above-mentioned patent applications is incorporated herein by reference and made a part of this specification.

BACKGROUND OF THE INVENTION

1. Technical Field

The invention relates to a catalytic cracking gasoline prehydrogenation method, which is used to produce low-olefin, ultralow-sulfur and high-octane clean gasoline.

2. Description of Related Art

FCC gasoline is a mixture of hydrocarbons with 4-12 carbon atoms and trace amounts of sulfides, oxides, metal arsenides, etc. According to the differences in the nature of crude oil and processing routes of various refineries, FCC gasoline is a mixture of olefins (18-55 v %), aromatics (12-20 v %) and alkanes. In terms of the octane number property, all the components are sequenced as follows: aromatics>alkenes≈isoparaffins>alkanes. High-sulfur, high-olefin and low-octane FCC gasoline accounts for about 70% in China, and the proportion of low-sulfur, low-olefin and high-octane alkylated oil, isomerized oil and reformed oil is low. This means the clean production of FCC gasoline in China needs to reach the triple mission goals of desulfurization, olefin reduction and maintaining octane number.

Alumina carriers are widely used in fields of heterogeneous catalysts, catalyst carriers, etc. The thermal stability, hydrothermal stability, and coking resistance of the carrier alumina are not ideal. Usually additives are added for modification to improve the performance of the carriers. There are many patented technologies for modified alumina carriers. CN201310429334.6 discloses a high-performance catalyst carrier and a preparation method thereof, applied to catalyst carrier material for heterogeneous catalytic reactions. The main component of this high-performance catalyst carrier is a mixture of oxides of Al, Zr, Mg, Ti, and Si, modified with rare earth elements or chromium. The preparation method includes the preparation of carrier particles and the modification of carrier particles. The prepared high-temperature carrier has a specific surface area of 80 m²/g or above and a pore volume of 0.3 ml/g, and the specific surface area retention rate after high-temperature steam treatment is 90% or above. The catalyst carrier can be used for the preparation of high-temperature reaction catalysts, can withstand high temperatures above 600° C., and can be used at a temperature between 400° C. and 650° C. In the high temperature reaction, the active ingredient metal or metal oxide particles are hardly sintered and keep stable performance, and the catalyst has a long life. CN200780024779.9 provides an exhaust gas purification catalyst, which has a porous silica carrier composed of silica having a pore structure, and perovskite-type composite oxide particles loaded in the pore structure of the porous silica carrier. Here, in this porous silica carrier, in its pore distribution, the peak derived from the gap between the primary particles is in the range of 3 nm to 100 nm.

The most commonly used carrier for gasoline hydrodesulfurization catalysts is alumina. In order to improve the activity and stability of the catalyst, a composite carrier is prepared by using modified alumina such as silicon, titanium, magnesium, boron, and phosphorus, which can adjust the pore structure, surface acidity of the catalyst and the interaction between the active ingredients and the carrier. In addition, adjusting the pore structure of the carrier will also increase the specific surface of the carrier, and its performance is several times superior to that of similar products currently used.

CN201610561945.X relates to a thiol etherification catalyst and a preparation method and application thereof. 75% to 85% of NiO—SiO$_2$ powder, 5% to 10% of NiO, the balance of Al$_2$O$_3$ were added to a dilute nitric acid solution and well mixed, the resulting material is subjected to extrusion molding, drying and calcination, thus obtaining the catalyst, where NiO—SiO$_2$ powder is made by a sol-gel method. The thiol etherification catalyst of the invention has abundant weak acid sites, high thiol etherification activity, high activity stability, and high selectivity. CN201611056044.1 provides a low-temperature thiol etherification catalyst and a preparation method and application thereof. The catalyst uses alumina modified by an alkaline additive as a carrier, and uses NiO, MoO$_3$ and WO$_3$ as active ingredients; wherein based on the total weight of the low-temperature thiol etherification catalyst being 100%, the catalyst includes 6-15 wt % of NiO, 0.1-10 wt % of MoO$_3$, 0.1-10 wt % of WO$_3$, 0.1-5 wt % of an oxide of an alkaline additive, and the balance of the alumina carrier. A preparation method of the above-mentioned catalyst and its application in the thioetherification reaction of mercaptan contained in catalytic gasoline or liquefied petroleum gas with olefins or diolefins are further provided. The catalyst provided by this invention has mild reaction conditions, high reaction activity, high desulfurization efficiency and low price, and can be used in the deep desulfurization process of gasoline and liquefied petroleum gas.

At present, among the gasoline quality upgrading technologies commonly used by domestic refineries, the highly selective desulfurization process represented by Prime-G technology adopts a prehydrogenation-light and heavy gasoline cutting-heavy gasoline selective hydrodesulfurization-heavy gasoline supplementary desulfurization process principle. However, due to the different composition and content of specific gasoline raw materials, as well as different gasoline product standards, obvious differences also exist in terms of the gasoline upgrading process and the catalysts used.

BRIEF SUMMARY OF THE INVENTION

The invention provides a catalytic cracking gasoline prehydrogenation method for removing diolefins, mercaptans, and sulfides, while converting double bond isomeric terminal olefins into internal olefins; and saturating the remaining diolefins. The reaction product then undergoes desulfurization, octane recovery and other reaction units to produce low-olefin, ultralow-sulfur and high-octane clean gasoline.

Provided is a catalytic cracking gasoline prehydrogenation method. Thiol etherification and double bond isomerization reactions are carried out on catalytic cracking gasoline through a prehydrogenation reactor. The reaction conditions are as follows: the reaction temperature is between 80° C. and 160° C., the reaction pressure is between 1 MPa and 5 MPa, the liquid-volume hourly space velocity is from 1 to 10 h$^{-1}$, and the hydrogen-oil volume ratio is (3-8):1; a prehydrogenation catalyst used in the reaction comprises a carrier and active ingredients, the carrier contains an aluminium oxide composite carrier with a macroporous structure and one or more of ZSM-5, ZSM-11, ZSM-12, ZSM-35, mordenite, amorphous form aluminum silicon, SAPO-11, MCM-22, a Y molecular sieve and a beta molecular sieve; the alumina composite carrier with a macroporous structure contains 0.1-12 wt % of tungsten-doped lanthanum ferrite, the mesopores of the alumina composite carrier account for 1-85% of the total pores, and the macropores of the alumina composite carrier account for 1-70% of the total pores. Preferably, the mesopores account for 5-70% of the total pores, and preferably the macropores account for 5-45% of the total pores. The surface of the carrier loads one or more of the active ingredients cobalt, molybdenum, nickel, and tungsten; based on oxides, the active ingredient content is between 0.1% and 15.5%.

Further preferably, the reaction conditions are as follows: the reaction temperature is between 90° C. and 145° C., the reaction pressure is between 1 MPa and 4 MPa, the liquid-volume hourly space velocity is from 1 to 8 $h^{-1}$, and the hydrogen-oil volume ratio is (3-6):1.

The prehydrogenation reaction of the invention mainly includes the following: in the presence of the prehydrogenation catalyst, small molecule mercaptan and thioether undergo thioetherification reaction with diolefin and double bond isomerization (i.e., terminal olefins are converted into internal olefins), and the remaining diolefins are saturated. Side reactions such as olefin polymerization and excessive cracking are inhibited while thiol etherification and double bond isomerization, so as to improve the activity and selectivity of the catalyst and increase the liquid yield.

The aforementioned active ingredients cobalt, molybdenum, nickel, and tungsten may be one or more of various salts or respective oxides, sulfides, nitrides, and phosphides of the active ingredients.

The preparation method of the catalyst includes the following steps: preparing an impregnation solution with active ingredient materials containing cobalt, molybdenum, nickel and tungsten, impregnating the carrier in the impregnation solution, drying at 120-180° C. for 4-8 h, and calcining at 450-800° C. for 3-9 h, thus obtaining a prehydrogenation catalyst.

The alumina carrier contains 0.1-12 wt % of tungsten-doped lanthanum ferrite, mesopores of the carrier account for 1-85% of the total pores, and macropores account for 1-70% of the total pores. Preferably, the mesopores account for 5-70% of the total pores, and preferably the macropores account for 5-45% of the total pores.

Provided is a preparation method of an alumina composite carrier. The aluminum source and sesbania powder are added to a kneader and well mixed; an inorganic acid solution and an organic polymer are added and the mixture is well kneaded; and then tungsten-doped lanthanum ferrite is added, and the mixture is well kneaded; the resulting material is subjected to extruding, molding, drying and calcination, thus obtaining the alumina composite carrier.

The above alumina composite carrier powder and one or more of ZSM-5, ZSM-11, ZSM-12, ZSM-35, mordenite, SAPO-11, MCM-22, Y molecular sieve and beta molecular sieve powder are well mixed, sesbania powder and deionized water are then added and well mixed; an inorganic acid is added; the resulting material is stirred, dried, and calcined, thus obtaining a mixed carrier. The carrier loads one or more of the active ingredients cobalt, molybdenum, nickel, and tungsten; based on oxides of cobalt, molybdenum, nickel, and tungsten, the content of cobalt, molybdenum, nickel, and tungsten is between 0.1% and 15.5%.

The aluminum source for preparing the alumina composite carrier is one or more of pseudo-boehmite, alumina, and aluminum sulfate. The aluminum source can also be one or more of kaolin, rectorite, perlite, and montmorillonite.

Provided is a further improvement to the carrier, an improved alumina composite carrier. The carrier contains 0.1-12 wt % of silicon oxide and 0.1-10 wt % of tungsten-doped lanthanum ferrite, and mesopores of the carrier account for 1-80% of the total pores, and macropores account for 1-55% of the total pores. Preferably, the mesopores account for 1-65% of the total pores, more preferably 5-55%; preferably, the macropores account for 1-40% or 5-45% of the total pores, more preferably 10-35%. The micropores, mesopores, and macropores of the carrier are unevenly distributed.

Preferably, the tungsten-doped lanthanum ferrite in the alumina composite carrier accounts for 0.3-9 wt %, more preferably 0.3-5 wt %, and in the tungsten-doped lanthanum ferrite, tungsten accounts for 0.1-8 wt %.

The organic polymer is one or more of polyvinyl alcohol, sodium polyacrylate, polyethylene glycol, and polyacrylate, and preferably is polyacrylic acid or sodium polyacrylate.

Tungsten-doped lanthanum ferrite is added to the alumina carrier. Compared with the alumina carrier added with lanthanum ferrite ($LaFeO_3$), the alumina carrier is added with tungsten-doped lanthanum ferrite in cooperation with the introduction of one or more of ZSM-5, ZSM-11, ZSM-12, ZSM-35, mordenite, amorphous silica alumina, SAPO-11, MCM-22, Y molecular sieve and beta molecular sieve, thus obtaining a composite carrier; the composite carrier loads active components cobalt, molybdenum, nickel, and tungsten. The catalyst effectively promotes the thioetherification reaction and undergoes double bond isomerization (i.e., terminal olefins are converted into internal olefins), and the remaining diolefins are saturated. Especially the selectivity of the double bond isomerism is relatively high.

As a further improvement of the carrier, silicon oxide is preferably added to the alumina composite carrier. According to the preparation method of the alumina composite carrier, the aluminum source (e.g., pseudo-boehmite) and sesbania powder are added to a kneader and well mixed; an inorganic acid or organic acid solution and an organic polymer are added and the mixture is well kneaded; and then tungsten-doped lanthanum ferrite is added, and the mixture is well mixed, thus obtaining an alumina precursor for later use; a silicon source is added to the acid solution of the organic polymer and well mixed, and the mixture is then mixed with the alumina precursor, wherein the unit content of the organic polymer in the alumina precursor is 1.5 times higher than the content of the organic polymer in the silicon source; and the resulting material is subjected to extruding, molding, drying and calcination, thus obtaining the alumina carrier. The silicon source may be sodium silicate or fine silicon powder. The inorganic acid is nitric acid, hydrochloric acid, and sulfuric acid, and the organic acid is oxalic acid, citric acid, nitrilotriacetic acid, tartaric acid, acetic acid or malic acid.

In the further improvement of the above alumina carrier, the silicon source may be sodium silicate or fine silicon powder, or one or two of diatomaceous earth and opal, and the aluminum source may also be one or more of kaolin, rectorite, perlite, and montmorillonite.

The sub-molten salt medium in the activation process of kaolin, rectorite, perlite, and montmorillonite powder is $NaOH—H_2O$; the bauxite powder and sub-molten salt medium are well mixed in a mass ratio of 1:0.2-2, and the activation time is 0.5-4 h at a temperature between 100° C. and 400° C. The activation process of diatomaceous earth and opal is to calcine the diatomaceous earth at a temperature between 500° C. and 1000° C. for 1-10 h. The tungsten-doped lanthanum ferrite in the above alumina carrier preferably has micro-mesopores. The introduction of tungsten-doped lanthanum ferrite with micro-mesopores can help suppress side reactions such as hydrocarbon cracking and improve the selectivity of target products.

A preparation method of tungsten-doped lanthanum ferrite with micro-mesopores, citric acid is dissolved in deionized water and stirred and dissolved, and then lanthanum nitrate and ferric nitrate are added to citric acid, stirred and dissolved, and sodium polyacrylate or polyacrylic acid were added in an amount 0.1-9 wt %, preferably 0.1-6.0 wt % of the tungsten-doped lanthanum ferrite. Then, a tungsten-containing compound was added (based on the oxide, tungsten accounts for 0.1-8 wt % of tungsten-doped lanthanum ferrite) and stirred to take a reaction; the reaction product was dried, calcined, and ground, thus obtaining a finished product. The tungsten-containing compound refers to ammonium tungstate, ammonium metatungstate, ammonium paratungstate and the like.

The unit content of the organic polymer in the alumina precursor is more than 1.5 times higher than the content of the organic polymer in the silicon source. It can effectively improve the pore structure of the carrier. On the one hand, the carrier's micropores, mesopores, and macropores are unevenly distributed, reducing the occurrence of side reactions such as olefin polymerization and excessive cracking, improving selectivity, ensuring a high gasoline yield, and facilitating the long-term operation of the device. On the other hand, it is beneficial to produce more active site load centers on the surface of the carrier and improve the catalyst activity.

The prehydrogenation catalyst carrier of the invention includes an alumina composite carrier having a macroporous structure and one or more of ZSM-5, ZSM-11, ZSM-12, ZSM-35, mordenite, amorphous silica alumina, SAPO-11, MCM-22, Y molecular sieve and beta molecular sieve and is loaded with one or more of cobalt, molybdenum, nickel and tungsten. The prehydrogenation catalyst carrier is used for removing diolefins, mercaptans and sulfides from gasoline, and also converting the double bond isomerized terminal olefins into internal olefins; and saturating the remaining diolefins. It not only effectively promotes single-branched isomerization and increases the octane number, but also helps reduce the recracking reaction of low-carbon isomerized hydrocarbons, reduces the occurrence of side reactions such as olefin polymerization and excessive cracking, improves activity selectivity, and ensures a high gasoline yield.

The FCC gasoline prehydrogenation method of the invention has strong adaptability to different FCC gasolines. It removes diolefins, mercaptans and sulfides through thiol etherification and double bond isomerization, and saturates remaining alkanes with less octane loss. The FCC gasoline prehydrogenation method is suitable for the prehydrogenation of catalytic cracking gasoline to produce clean gasoline that meets national standards GB18352.5-2013 and GB 17930-2016.

DETAILED DESCRIPTION OF THE INVENTION

The invention is described in further detail below through examples, but these examples should not be considered as limiting the invention. The raw material reagents used in the invention are all commercially available products.

Example 1

1. Preparation of Tungsten-Doped Lanthanum Ferrite with Micro-Mesopores 2.2 mol of La $(NO_3)_3$ was dissolved in 100 mL of water in a stirring way, and citric acid was added and stirred to be dissolved; 4.2 mol of $Fe(NO_3)_3$, 160 g of sodium polyacrylate, and an aqueous solution containing 10 g of ammonium metatungstate were added in sequence and the resulting solution was further stirred for 30 min; the resulting solution was subjected to drying, calcination and grinding, thus obtaining micro-mesoporous tungsten-doped lanthanum ferrite.

2. Preparation of Alumina Carrier 2.2 g of micro-mesoporous tungsten-doped lanthanum ferrite was added with citric acid for later use, 300 g of pseudo-boehmite powder and 20.0 g of sesame powder were added to a kneader and well mixed, and then nitric acid and 8 g of sodium polyacrylate were added and the resulting material was kneaded well; the micro-mesoporous tungsten-doped lanthanum ferrite was then added and well mixed; the resulting material was kneaded and extruded into a clover shape. The resulting material was dried at 120° C. for 8 h and calcined at 700° C. for 4 h, thus obtaining an alumina carrier 1 containing the micro-mesoporous tungsten-doped lanthanum ferrite. The pore structure of the carrier is shown in Table 1.

3. Preparation of Catalyst

The alumina carrier 1 was kneaded and stirred together with sesame powder, acidified amorphous silicon-alumina, and deionized water, the resulting material was dried and calcined, thus obtaining a composite carrier 1-1; ammonium heptamolybdate and nickel nitrate were added to distilled water to prepare an impregnation solution to impregnate the composite carrier 1-1; the resulting catalyst precursor was dried at 140° C. and then calcined at 500° C. for 6 h, thus obtaining catalyst 1. The catalyst 1 mainly comprises: 73.2 wt % of the alumina carrier containing micro-mesoporous tungsten-doped lanthanum ferrite, 4.8 wt % of alumina, 5.2 wt % of silicon oxide, 7.7 wt % of nickel oxide, and 9.1 wt % of molybdenum oxide.

Example 2

1. Preparation of Tungsten-Doped Lanthanum Ferrite 2.2 mol of La $(NO_3)_3$ was dissolved in 100 mL of water in a stirring way, and citric acid was added and stirred to be dissolved; 4.2 mol of $Fe(NO_3)_3$ and an aqueous solution containing 10 g of ammonium metatungstate were added in sequence and the resulting solution was further stirred for 30 min; the resulting solution was subjected to drying, calcination and grinding, thus obtaining tungsten-doped lanthanum ferrite.

2. Preparation of Alumina Carrier 2.2 g of tungsten-doped lanthanum ferrite was added with citric acid, 300 g of pseudo-boehmite powder and 20.0 g of sesame powder were added to a kneader and well mixed, and then nitric acid and 8 g of sodium polyacrylate were added and the resulting material was kneaded well; the micro-mesoporous tungsten-doped lanthanum ferrite was then added and well mixed; the resulting material was kneaded and extruded into a clover shape. The resulting material was dried at 120° C. for 8 h and calcined at 700° C. for 4 h, thus obtaining an alumina carrier 2 containing the tungsten-doped lanthanum ferrite. The pore structure of the carrier is shown in Table 1.

3. Preparation of Catalyst

As in Example 1, zsm-5 was introduced into the carrier to obtain the composite carrier 2-1; the composite carrier 2-1 was impregnated in an impregnating solution containing molybdenum and cobalt, and the obtained catalyst precursor was dried at 140° C. and calcined at 530° C. for 5 h to obtain catalyst 2. The catalyst 2 mainly comprised: 71.5 wt % of the alumina carrier containing tungsten-doped lanthanum ferrite, 7 wt % of zsm-5, 10.8 wt % of molybdenum oxide, and 10.7 wt % of cobalt oxide.

Example 3

The preparation of the carrier was same as that in Example 1, except that the micro-mesoporous tungsten-doped lanthanum ferrite accounted for 6 wt % of the carrier. The preparation of the catalyst was the same as that in Example 1, and activated montmorillonite was used as the aluminum source. The difference lied in that the active ingredients were molybdenum and tungsten and the catalyst 3 mainly comprised: 75.6 wt % of the alumina carrier containing micro-mesoporous tungsten-doped lanthanum ferrite, 4.0 wt % of alumina, 4.0 wt % of silicon oxide, 10.1 wt % of molybdenum oxide, and 9.1 wt % of tungsten oxide.

Example 4

Preparation of Modified Alumina Carrier 2 g of sodium polyacrylate was dissolved in nitric acid, and 28 g of fine silicon powder was added and stirred well to obtain a fine silicon powder-sodium polyacrylate mixture; 1/10 of the resulting mixture was taken for later use, and citric acid was added to 2.0 g of the micro-mesoporous tungsten-doped lanthanum ferrite and the resulting material was set aside for later use. 310 G of pseudo-boehmite powder and 22.0 g of sesame powder were added into the kneader, nitric acid and 28 g of a nitric acid solution of sodium polyacrylate were then added in sequence and well mixed, the above-mentioned fine silicon powder-sodium polyacrylate mixture was added and knead well; and then the micro-mesoporous tungsten-doped lanthanum ferrite was added and well mixed; and the resulting material was kneaded and extruded into a clover shape. The resulting material was dried at 130° C. for 7 h and calcined at 650° C. for 5 h, thus obtaining an alumina carrier 4 containing the micro-mesoporous tungsten-doped lanthanum ferrite and silicon oxide.

The preparation of the catalyst was the same as that in Example 2, except that the active ingredients were tungsten, nickel, and molybdenum, and the catalyst 4 mainly comprised: 71.7 wt % of the alumina carrier containing micro-mesoporous tungsten-doped lanthanum ferrite, 5 wt % of zsm-5, 7.8 wt % of tungsten oxide, 3.2 wt % of nickel oxide, and 12.3 wt % of molybdenum oxide.

Example 5

2.0 mol of La $(NO_3)_3$ was dissolved in 100 mL of water in a stirring way, and citric acid was added and stirred to be dissolved; 4.0 mol of Fe$(NO_3)_3$, 160 g of sodium polyacrylate, and an aqueous solution containing 12 g of ammonium metatungstate were added in sequence and the resulting solution was further stirred for 30 min; the resulting solution was subjected to drying, calcination and grinding, thus obtaining micro-mesoporous tungsten-doped lanthanum ferrite.

The preparation of the carrier was the same as that in Example 4, except that the tungsten-doped lanthanum ferrite accounted for 3 wt % of the carrier, and activated diatomite and kaolin were used as a silicon source and an aluminum source. The catalyst 5 mainly comprised: 74.0 wt % of the alumina carrier containing tungsten-doped lanthanum ferrite and silicon oxide, 4 wt % of zsm-5, 12.9 wt % of molybdenum oxide, and 9.1 wt % of tungsten oxide.

Example 6

The preparation of the catalyst was the same as that in Example 4, except that mordenite was added to the catalyst, and the catalyst 6 mainly comprised: 80.1 wt % of the alumina carrier 4 containing micro-mesoporous tungsten-doped lanthanum ferrite and silicon oxide, 6.8 wt % of mordenite, 10.4 wt % of molybdenum oxide, and 2.7 wt % of tungsten oxide. Activated diatomite and kaolin were used as a silicon source and an aluminum source.

Example 7

The preparation of the catalyst was the same as that in Example 6, except that beta molecular sieve was added to the catalyst, and the catalyst 7 mainly comprised: 72.8 wt % of the alumina carrier 4 containing micro-mesoporous tungsten-doped lanthanum ferrite and silicon oxide, 6.7 wt % of the beta molecular sieve, 10.4 wt % of molybdenum oxide, and 10.1 wt % of nickel oxide. Activated diatomite and kaolin were used as a silicon source and an aluminum source.

Comparative Example 1

The preparation of the carrier was the same as that in Example 4, except that lanthanum ferrite was added. The preparation of the catalyst was the same as that in Example 4, and the reaction conditions were the same as those in Example 4. The reaction results are shown in Table 2.

TABLE 1

The specific surface area and pore size distribution of the macroporous alumina carrier

| | Specific surface area $m^2/g$ | Total pore volume ml/g | Macropore size ml/g | Macropore size nm | Mesopore size nm |
|---|---|---|---|---|---|
| 1 | 264.2 | 1.57 | 0.75 | 121 | 31 |
| 2 | 257.7 | 1.66 | 0.87 | 96 | 40 |
| 3 | 268.2 | 1.51 | 0.56 | 103 | 21 |
| 4 | 262.4 | 1.81 | 0.60 | 147 | 34 |
| 5 | 265.3 | 1.75 | 0.45 | 132 | 26 |

TABLE 2

Catalyst prehydrogenation results

| Catalyst | Mercaptan removal rate % | Internal olefin increase % | Octane loss | Diolefin removal rate % | Gasoline yield wt % |
|---|---|---|---|---|---|
| Example 1 | 93.6 | 0.23 | 0.3 | 100 | 98.4 |
| Example 2 | 96.8 | 0.40 | 0.4 | 100 | 98.3 |
| Example 3 | 94.6 | 0.32 | 0.2 | 100 | 98.6 |
| Example 4 | 98.4 | 0.38 | 0.2 | 100 | 99.4 |
| Example 5 | 97.7 | 0.52 | 0.3 | 100 | 99.1 |
| Example 6 | 97.9 | 0.44 | 0.2 | 100 | 99.2 |
| Example 7 | 98.9 | 0.50 | 0.2 | 100 | 99.3 |
| Comparative Example 1 | 89.7 | | 0.6 | 87.2 | 95.8 |

FCC gasoline was hydrogenated through a prehydrogenation reactor in the presence of the prehydrogenation catalysts 1, 3, 4, 7 to remove diolefins, mercaptans, and sulfides, and also realize double bond isomerization (i.e., conversion of terminal olefins into internal olefins), and saturate the remaining diolefins. The reaction temperature was 115° C., the reaction pressure was 1.8 MPa, the liquid-volume hourly space velocity was 5 h$^{-1}$, and the hydrogen-oil volume ratio was 4:1. The reaction results are shown in Table 2.

During the prehydrogenation catalysts 2, 5, and 6, the reaction temperature was 108° C., wherein the reaction pressure was 1.4 MPa, the liquid-volume hourly space velocity was 4 h$^{-1}$, and the hydrogen-oil volume ratio was 3:1. The reaction results are shown in Table 2.

The prehydrogenation catalysts 1-7 has the advantages of low octane loss, high gasoline yield, high mercaptan removal rate, and good activity. The catalysts can effectively inhibit side reactions such as olefin polymerization and excessive cracking, inhibit the cracking reaction of low-carbon hydrocarbons, ensure a high gasoline yield, which is conducive to the long-term operation of the device; the surface of the catalyst carrier produces more active site load centers, which effectively improves the activity of the catalysts in removing diolefins, mercaptans, sulfides, and double bond isomerization. The catalysts have good activity and selectivity. After 600 hours of the reaction, for the products of the prehydrogenation catalysts 4 and 7, the mercaptan removal rates were 98.2% and 98.6%, respectively; the octane losses were 0.2 unit and 0.3 unit, respectively; the carbon deposition rates were 0.3 and 0.2, respectively; the liquid yields were 99.6% and 99.0% respectively; the internal olefin increases were 0.37% and 0.42%, respectively; the diolefin removal rates were 100% and 100%, respectively; and the reaction performance of the catalysts was stable.

Certainly, the invention can also have various other embodiments. Without departing from the spirit and essence of the invention, those skilled in the art can make various corresponding changes and modifications according to the invention, but these corresponding changes and deformation should belong to the protection scope of the invention.

What is claimed is:

1. A catalytic cracking gasoline prehydrogenation method, comprising:
   pumping catalytic cracking gasoline into a prehydrogenation reactor; and
   carrying out thiol etherification and double bond isomerization reactions on the catalytic cracking gasoline with a prehydrogenation catalyst through the prehydrogenation reactor, wherein the reaction conditions are as follows: the reaction temperature is between 80° C. and 160° C., the reaction pressure is between 1 MPa and 5 MPa, the liquid-volume hourly space velocity is from 1 to 10 h$^{-1}$, and the hydrogen-oil volume ratio is (3-8):1; the prehydrogenation catalyst comprises a carrier and active ingredients, the carrier contains an aluminium oxide composite carrier with a macroporous structure and one or more of ZSM-5, ZSM-11, ZSM-12, ZSM-35, mordenite, amorphous form aluminum silicon, SAPO-11, MCM-22, a Y molecular sieve and a beta molecular sieve; the alumina composite carrier contains 0.1-12 wt % of tungsten-doped lanthanum ferrite, the mesopores of the alumina composite carrier account for 1-85 % of the total pores, and the macropores of the alumina composite carrier account for 1-70 % of the total pores; the surface of the carrier loads one or more of the active ingredients comprising cobalt, molybdenum, nickel, and tungsten, and based on oxides, the content of the active ingredients is between 0.1% and 15.5%; the tungsten-doped lanthanum ferrite is tungsten-doped lanthanum ferrite with micro-mesopores and the preparation method of the tungsten-doped lanthanum ferrite with micro-mesopores comprises: dissolving citric acid in water and stirring; next, adding lanthanum nitrate and ferric nitrate to the citric acid solution at stirring conditions; adding sodium polyacrylate or polyacrylic acid in an amount which is 0.1-9 wt % of the tungsten-doped lanthanum ferrite, and then adding a tungsten-containing compound, based on oxides, the tungsten content accounts for 0.1-8 wt % of the tungsten-doped lanthanum ferrite; stirring and reacting; and drying, calcining and grinding the resulting material, thus obtaining a finished product.

2. The catalytic cracking gasoline prehydrogenation method according to claim 1, wherein the reaction conditions are as follows: the reaction temperature is between 90° C. and 145° C., the reaction pressure is between 1 MPa and 4 MPa, the liquid-volume hourly space velocity is from 1 to 8 $^{-1}$, and the hydrogen-oil volume ratio is (3-6):1.

3. The catalytic cracking gasoline prehydrogenation method according to claim 2, wherein the aluminium oxide composite carrier contains 0.1-12 wt % of silicon oxide and 0.1-10 wt % of tungsten-doped lanthanum ferrite; mesopores account for 1-80% of the total pores, macropores account for 1-40% of the total pores, and the micropores, mesopores, and macropores in the carrier are unevenly distributed.

4. The catalytic cracking gasoline prehydrogenation method according to claim 2, wherein the preparation method of the alumina composite carrier comprises: adding an aluminum source and sesbania powder to a kneader and mixing; adding an inorganic acid solution and an organic polymer and kneading; and then adding tungsten-doped lanthanum ferrite and kneading; and carrying out extruding, molding, drying and calcination, thus obtaining the alumina composite carrier.

5. The catalytic cracking gasoline prehydrogenation method according to claim 2, wherein the preparation method of the prehydrogenation catalyst comprises: preparing an impregnation solution with active ingredient materials containing cobalt, molybdenum, nickel and tungsten, impregnating the carrier in the impregnation solution, drying at 120-180° C. for 4-8 h, and calcining at 450-800° C. for 3-9 h, thus obtaining a prehydrogenation catalyst.

6. The catalytic cracking gasoline prehydrogenation method according to claim 1, wherein the tungsten-doped lanthanum ferrite in the alumina composite carrier accounts for 0.3-9 wt %, and in the tungsten-doped lanthanum ferrite, tungsten accounts for 0.1-8 wt %.

7. The catalytic cracking gasoline prehydrogenation method according to claim 6, wherein the preparation method of the prehydrogenation catalyst comprises: preparing an impregnation solution with active ingredient materials containing cobalt, molybdenum, nickel and tungsten, impregnating the carrier in the impregnation solution, drying at 120-180° C. for 4-8 h, and calcining at 450-800° C. for 3-9 h, thus obtaining a prehydrogenation catalyst.

8. The catalytic cracking gasoline prehydrogenation method according to claim 1, wherein in the aluminium oxide composite carrier with a macroporous structure, mesopores account for 5-70% of the total pores, and macropores account for 5-45% of the total pores.

9. The catalytic cracking gasoline prehydrogenation method according to claim 1, wherein the aluminium oxide composite carrier contains 0.1-12 wt % of silicon oxide and 0.1-10 wt % of tungsten-doped lanthanum ferrite; mesopores account for 1-80% of the total pores, macropores account for 1-40% of the total pores, the micropores, mesopores, and macropores in the carrier are unevenly distributed.

10. The catalytic cracking gasoline prehydrogenation method according to claim 9, wherein the preparation method of the alumina composite carrier comprises: adding an aluminum source and sesbania powder to a kneader and mixing; adding an inorganic acid or organic acid solution and an organic polymer and kneading; and then adding tungsten-doped lanthanum ferrite and mixing, thus obtaining an alumina precursor for later use; adding a silicon source to an acid solution of an organic polymer and mixing, and then mixing the resulting solution with the alumina precursor, wherein the unit content of the organic polymer in the alumina precursor is 1.5 times higher than the content of the organic polymer in the silicon source; and carrying out extruding, molding, drying and calcination, thus obtaining the alumina carrier.

11. The catalytic cracking gasoline prehydrogenation method according to claim 10, wherein the silicon source is one or two of diatomite and opal, and the aluminum source is one or more of kaolin, rectorite, perlite, and montmorillonite.

12. The catalytic cracking gasoline prehydrogenation method according to claim 1, wherein the preparation method of the alumina composite carrier comprises: adding an aluminum source and sesbania powder to a kneader and mixing; adding an inorganic acid solution and an organic polymer and kneading; and then adding tungsten-doped lanthanum ferrite and kneading; and carrying out extruding, molding, drying and calcination, thus obtaining the alumina composite carrier.

13. The catalytic cracking gasoline prehydrogenation method according to claim 12, wherein the organic polymer is one or more of polyvinyl alcohol, sodium polyacrylate, polyethylene glycol, and polyacrylate.

14. The catalytic cracking gasoline prehydrogenation method according to claim 1, wherein the preparation method of the prehydrogenation catalyst comprises: preparing an impregnation solution with active ingredient materials containing cobalt, molybdenum, nickel and tungsten, impregnating the carrier in the impregnation solution, drying at 120-180° C. for 4-8 h, and calcining at 450-800° C. for 3-9 h, thus obtaining a prehydrogenation catalyst.

* * * * *